United States Patent
Lee et al.

(10) Patent No.: US 12,527,332 B2
(45) Date of Patent: Jan. 20, 2026

(54) METHOD FOR PRODUCING FERMENTED GREEN COFFEE BEANS BY COMPLEX FERMENTATION AND FERMENTED GREEN COFFEE BEANS PRODUCED THEREBY

(71) Applicant: BIOLIV Co., Ltd., Gyeonggi-do (KR)

(72) Inventors: Hyun Koo Lee, Gyeonggi-do (KR); Sung Eun Lee, Gyeonggi-do (KR)

(73) Assignee: BIOLIV Co., Ltd., Gyeonggi-do (KR)

( * ) Notice: Subject to any disclaimer, the term of this patent is extended or adjusted under 35 U.S.C. 154(b) by 483 days.

(21) Appl. No.: 18/001,040

(22) PCT Filed: Jun. 2, 2021

(86) PCT No.: PCT/KR2021/006890
§ 371 (c)(1),
(2) Date: Dec. 7, 2022

(87) PCT Pub. No.: WO2021/251681
PCT Pub. Date: Dec. 16, 2021

(65) Prior Publication Data
US 2023/0217947 A1    Jul. 13, 2023

(30) Foreign Application Priority Data

Jun. 10, 2020   (KR) .................. 10-2020-0070053

(51) Int. Cl.
| | |
|---|---|
| A23F 5/02 | (2006.01) |
| A23B 9/08 | (2006.01) |
| A23B 9/12 | (2006.01) |
| A23F 5/20 | (2006.01) |
| C12N 1/20 | (2006.01) |
| C12N 9/42 | (2006.01) |
| C12N 9/88 | (2006.01) |
| C12R 1/24 | (2006.01) |

(52) U.S. Cl.
CPC .................. *A23F 5/02* (2013.01); *A23B 9/08* (2013.01); *A23B 9/12* (2013.01); *A23F 5/204* (2013.01); *C12N 1/20* (2013.01); *C12N 9/2437* (2013.01); *C12N 9/88* (2013.01); *C12R 2001/24* (2021.05); *C12Y 302/01004* (2013.01); *C12Y 302/01015* (2013.01); *C12Y 402/0201* (2013.01)

(58) Field of Classification Search
CPC .... A23F 5/02; A23F 5/204; A23F 5/16; A23F 5/163; A23F 5/20; A23B 9/08; A23B 9/12; C12N 1/20; C12N 9/88; C12N 9/2437; C12R 2001/24; C12Y 302/01004; C12Y 302/01015; C12Y 402/0201
See application file for complete search history.

(56) References Cited

U.S. PATENT DOCUMENTS

| | | |
|---|---|---|
| 2010/0316763 A1 | 12/2010 | Choi |
| 2016/0324179 A1 | 11/2016 | Park |

FOREIGN PATENT DOCUMENTS

| | | | |
|---|---|---|---|
| CN | 103211176 | | 7/2013 |
| JP | 6442655 | | 12/2018 |
| KR | 20030071740 | | 9/2003 |
| KR | 10-2010-0020121 | | 2/2010 |
| KR | 10-1298557 | | 8/2013 |
| KR | 20140011235 | | 1/2014 |
| KR | 20140055202 | | 5/2014 |
| KR | 1020160025090 | | 3/2016 |
| KR | 1020160063645 | | 6/2016 |
| KR | 20170001027 | * | 1/2017 |
| KR | 101738303 | | 5/2017 |
| KR | 10-2018-0070037 | | 6/2018 |
| KR | 1020190083685 | | 7/2019 |
| WO | 2016/066167 | | 5/2016 |

OTHER PUBLICATIONS

English translation for KR20170001027 published Jan. 4, 2017.*
Lee et al. 2015. "Coffee fermentation and flavor—An intricate and delicate relationship." Food Chem. vol. 185, pp. 182-191. http://dx.doi.org/10.1016/j.foodchem.2015.03.124.*
Wang et al. 2020. "Coffee flavour modification through controlled fermentation of green coffee beans by *Lactococcus lactis* subsp. *cremoris*." Food Sci. Tech. https://doi.org/10.1016/j.lwt.2019.108930.*
Kornan. 2018. "Freezing Green Coffee: A Tale of Infestation, Treatment and Consequences." Downloaded Oct. 27, 2025 from https://royalcoffee.com/freezing-green-coffee-a-tale-of-infestation-treatment-and-consequences/.*

* cited by examiner

*Primary Examiner* — Nikki H. Dees
(74) *Attorney, Agent, or Firm* — DUANE MORRIS LLP; Gregory M. Lefkowitz; Brandon A. Chan

(57) ABSTRACT

The present disclosure relates to a method for producing fermented green coffee beans and fermented green coffee beans produced thereby, the method including: (A) a step of freezing green coffee beans at −10 to −25° C.; (B) a step of immersing the frozen green coffee beans in water for 3 to 10 hours; (C) a step of taking out the green coffee beans immersed in the water, removing the water and leaving the beans to stand for 5 to 15 hours while supplying air at 20 to 30° C.; (D) a step of sterilizing the green coffee beans and then inoculating the same with a strain to anaerobically ferment the same; and (E) a step of sterilizing and then drying the anaerobically fermented green coffee beans. When the fermented green coffee beans are roasted into coffee beans, aroma and taste may be improved and odor may be removed.

9 Claims, No Drawings

METHOD FOR PRODUCING FERMENTED GREEN COFFEE BEANS BY COMPLEX FERMENTATION AND FERMENTED GREEN COFFEE BEANS PRODUCED THEREBY

CROSS-REFERENCE TO RELATED APPLICATIONS

This application is a § 371 national stage entry of International Application No. PCT/KR2021/006890, filed on Jun. 2, 2021, which claims priority to Korean Patent Application No. 10-2020-0070053, filed on Jun. 10, 2020, the entire contents of which are incorporated herein by reference.

TECHNICAL FIELD

The present disclosure relates to a method for producing fermented green coffee beans and fermented green coffee beans produced thereby, which have improved aroma and taste and have odor removed when roasted into coffee beans.

BACKGROUND ART

Coffee belongs to the genus *Coffea* of the family Rubiaceae. The three main cultivars commercially cultivated are *arabica* (*Coffea arabica*), *robusta* (*Coffea canephora*) and *liberica* (*Coffea liberica*).

Among them, *arabica* coffee, which is regarded to have the best quality due to good aroma and taste, is native to Ethiopia. It grows well in highlands of 500-1,000 m above sea level at temperatures of 15 to 25° C. It is produced in Brazil, Colombia, Mexico, Guatemala and Ethiopia and accounts for 75% of all the coffee produced worldwide.

Coffee has been cultivated since the 9th century in Ethiopia as a beverage with bitter, sour, sweet and astringent tastes. As of 2018, it was the most traded commodity, second only to petroleum, with 2.64 million tons in Europe, 1.57 million tons in the US and 150,000 tons in Korea.

Coffee is the representative beverage with well-harmonized bitter, astringent, sour and sweet tastes. It is the most widely enjoyed beverage worldwide and the coffee market is also growing continuously in Korea with the spread of coffee shops and increase of self consumption.

As it is known that coffee contains substances having superior effect on Alzheimer's disease, Parkinson's disease, type 2 diabetes, cholesterols, heart disease, liver cirrhosis, etc., the pharmacological effect of coffee is being researched a lot.

However, it is known that excessive coffee intake can lead to caffeinism such as anxiety, nervousness, sleep disorder, gastroenteric trouble, etc. and there are contradictory reports about the effect of caffeine on the increase of fat oxidation, leading to increased free fatty acids, cholesterols and triglycerides in blood thereby causing cardiovascular diseases, particularly coronary artery disease. The correlation between coffee intake and cardiovascular diseases is still controversial.

The representative ingredients of coffee include caffeine, chlorogenic acid, niacin, potassium, trigonelline, amino acids, etc. Among them, caffeine, which is the main ingredient of coffee, is an odorless, bitter-tasting alkaloid compound. It dissolves well in water. Excessive caffeine intake can cause gastroesophageal reflux and sour stomach by promoting gastric acid secretion and lowering the esophageal sphincter pressure. In addition, since it can cause insomnia, nervousness, anxiety and osteoporosis, it has a negative effect on coffee.

Fermentation refers to a process wherein an organic substance is degraded through the action of an enzyme possessed by microorganisms such as yeast, bacteria, etc. Organisms obtain not only energy but also enzymes for digestion and maintenance of metabolism from food intake.

As prior arts for obtaining fermented coffee, Korean Patent Publication No. 2003-0071740 discloses 'Fermented coffee rice containing fermented coffee components in fermented rice', and Korean Patent Publication No. 2014-0055202 discloses 'Method for preparing fermented coffee using coffee extract and concentrate'. However, a method of obtaining germinated coffee beans from green coffee beans and obtaining fermented green coffee beans by inoculating the germinated coffee beans with a cultured strain has not been known yet.

DISCLOSURE

Technical Problem

The present disclosure is directed to providing a method for producing fermented green coffee beans, which have improved aroma and taste and have odor removed when roasted into coffee beans.

The present disclosure is also directed to providing fermented green coffee beans produced by the method described above.

Technical Solution

A method for producing fermented green coffee beans according to the present disclosure may include: (A) a step of freezing green coffee beans at −10 to −25° C.; (B) a step of immersing the frozen green coffee beans in water for 3 to 10 hours; (C) a step of taking out the green coffee beans immersed in the water, removing the water and leaving the beans to stand for 5 to 15 hours while supplying air at 20 to 30° C.; (D) a step of sterilizing the green coffee beans and then inoculating the same with a strain to anaerobically ferment the same; and (E) a step of sterilizing and then drying the anaerobically fermented green coffee beans.

The method may further include, after the step (C), a step of enzymatically treating the green coffee beans by adding 0.05-1 parts by weight of an enzyme per 100 parts by weight of the green coffee beans.

The enzyme may be polygalacturonase, pectinase, hemicellulase, cellulase or a mixture thereof. When the mixture is used, several enzymes may be used sequentially or simultaneously.

In the step (A), the green coffee beans may be frozen for 3 to 24 hours.

In the step (B), the temperature of the water may be 20 to 27° C.

In the step (B), 0.05-0.1 part by weight of a mixture of calcium oxide or baking powder and salt may be added per 100 parts by weight of the water 10 to 20 minutes before taking out the green coffee beans from the water.

In the step (D), the strain may be *Lactococcus lactis, Lactococcus cremoris, Lactococcus diacetyllactis, Leuconostoc mesenteroides, Lactobacillus brevis* or a mixture thereof.

In the step (D), the anaerobic fermentation may be performed at 35 to 41° C. for 20 to 40 hours after culturing the strain in liquid to $1.0 \times 10^5$ to $1.0 \times 10^{15}$ cfu/g.

In addition, fermented green coffee beans may be produced by the method according to the present disclosure.

Advantageous Effects

When the fermented green coffee beans of the present disclosure are roasted, the content of caffeine is decreased, the contents of GABA, isoflavone, total polyphenols and vitamins are increased, aroma, taste and color are improved, and sensory property is improved as odor is removed.

BEST MODE

The present disclosure relates to a method for producing fermented green coffee beans, which have improved aroma, taste and color and have odor removed when roasted into coffee beans, and fermented green coffee beans produced thereby.

In the present disclosure, in consideration of the characteristics of green coffee beans, internal germination is conducted for the inside of the green coffee beans by immersing in water and supplying oxygen, and fermentation is conducted on the surface of the green coffee beans by inoculating with a strain. The internal germination refers to treatment to a state before budding.

Hereinafter, the present disclosure is described in detail.

A method for producing fermented green coffee beans according to the present disclosure may include: (A) a step of freezing green coffee beans at −10 to −25° C.; (B) a step of immersing the frozen green coffee beans in water for 3 to 10 hours; (C) a step of taking out the green coffee beans immersed in the water, removing the water and leaving the beans to stand for 5 to 15 hours while supplying air at 20 to 30° C.; (D) a step of sterilizing the green coffee beans and then inoculating the same with a strain to anaerobically ferment the same; and (E) a step of sterilizing and then drying the anaerobically fermented green coffee beans.

The method may further include, after the step (C), a step of enzymatically treating the green coffee beans by adding 0.05-1 parts by weight of an enzyme per 100 parts by weight of the green coffee beans.

First, in the step (A), the green coffee beans may be frozen for 3 to 24 hours, specifically for 4 to 12 hours, more specifically for 6 to 7 hours at −10 to −25° C., specifically at −15 to −20° C.

In the present disclosure, the green coffee beans are frozen and then subjected to internal germination for the inside and anaerobic fermentation for the surface. If the freezing is not conducted, the internal germination and the surface fermentation may not be conducted as desired.

If the temperature and time of the freezing of the green coffee beans are below the lower limits, the internal germination and anaerobic fermentation may not be conducted. And, if they are above the upper limits, the quality of the green coffee beans may be degraded.

Next, in the step (B), the frozen green coffee beans are macerated by immersing in water at 20 to 27° C. for 3 to 10 hours.

The internal germination and anaerobic fermentation are conducted well only after the green coffee beans are macerated in water.

If the temperature and time of the immersion in water for macerating the green coffee beans are outside the above-described ranges, the green coffee beans may not be macerated well.

In the step (B), 0.05-0.5 part by weight, specifically 0.1-0.2 part by weight, of a mixture of calcium oxide or baking powder and salt may be added per 100 parts by weight of the water 10 to 20 minutes before taking out the green coffee beans from the water for washing and sterilization. As a result, sensory property after the internal germination and anaerobic fermentation is further improved.

Next, in the step (C), internal germination is conducted for 5 to 15 hours, specifically for 7 to 10 hours, while supplying air at 20 to 30° C. after taking out the green coffee beans immersed in the water and completely removing the water from the surface of the green coffee beans.

Germination is usually divided into a preparative step before budding and a budding step. It is important that the internal germination (preparative step for germination) of the present disclosure is conducted before budding occurs in the green coffee beans because nutrients are concentrated on buds after the budding.

When the internal germination of the present disclosure is conducted, the activities of various enzymes, nutrients and functional ingredients are improved and the aroma, taste and color of coffee are improved after roasting.

In the present disclosure, the internal germination is conducted by supplying air to the green coffee beans immersed in the water specifically without overturning or moving the green coffee beans. If the internal germination is conducted under nitrogen gas rather than under air, the aroma of coffee may worsen and strong bitter taste may occur due to proliferation of various bacteria. And, if the green coffee beans immersed in the water are overturned or moved, the aroma and taste may not be improved because the internal germination is not conducted as desired.

If the temperature and time of the internal germination are below the lower limits, the germination may not occur or the sensory property may be degraded. And, if they are above the upper limits, nutrients may be decreased and the sensory property may be degraded significantly due to budding.

Next, after the step (C), the green coffee beans may be treated enzymatically by adding 0.05-1 part by weight, specifically 0.1-0.5 part by weight, of an enzyme per 100 parts by weight of the green coffee beans.

By enzymatically the green coffee beans, the content of caffeine may be decreased further, the contents of ingredients helpful to the body may be increased, and odor may be removed. These effects may be enhanced further by conducting the enzymatic treatment between the internal germination and the anaerobic fermentation. If the enzymatic treatment is conducted before the step (B) or after the step (D), the content of caffeine may not be decreased, odor may not be removed, and the sensory property may be degraded.

The enzyme may be polygalacturonase, pectinase, hemicellulase, cellulase or a mixture thereof.

When the mixture is used, several enzymes may be used sequentially or simultaneously. Specifically, 2 to 4 enzymes may be treated sequentially.

Next, in the step (D), the green coffee beans (or the enzymatically treated green coffee beans) are sterilized and then anaerobically fermented by inoculating with a strain.

After sterilizing the internally germinated green coffee beans at 120 to 125° C. for 1 to 5 minutes, the surface of the green coffee beans is fermented by inoculating with a strain. As a result, odor is removed and the coffee prepared therefrom becomes creamy with reduced carbonated taste.

Because green coffee beans are living plants, the strain cannot penetrate into cells and fermentation generally occurs only on the surface. Therefore, in the present disclosure, the inside of the green coffee beans is germinated first and then the surface is fermented.

The strain may be *Lactococcus lactis, Lactococcus cremoris, Lactococcus diacetyllactis, Leuconostoc mesenteroides, Lactobacillus brevis* or a mixture thereof.

In the present disclosure, the strain is cultured in liquid to $1.0 \times 10^5$ to $1.0 \times 10^{15}$ cfu/g, specifically $1.0 \times 10^6$ to $1.0 \times 10^{10}$ cfu/g. If the number of the bacteria is smaller than the lower limit, a long time may be required for the fermentation. And, if it exceeds the upper limit, strong sour taste may occur.

The green coffee beans are anaerobically fermented at 35 to 40° C. for 20 to 40 hours by inoculating with the strain.

Next, in the step (E), the anaerobically fermented green coffee beans are sterilized at 90 to 100° C., cooled and then dried at 25 to 35° C. for 10 to 20 hours to prepare fermented green coffee beans.

Mode for Invention

Hereinafter, specific examples are presented to help the understanding of the present disclosure. However, the following examples are presented merely as examples of the present disclosure and it will be obvious to those skilled in the art that various changes and modifications can be made within the scope of the present disclosure and such changes and modifications are encompassed in the scope of the appended claims.

Preparation Example 1. Preparation of Liquid Culture: *Lactococcus lactis*

After mixing 100 parts by weight of distilled water, 0.8 part by weight of potato powder and 4 parts by weight of glucose, sterilizing at 100° C. for 1 minute and then cooling to 25° C., a liquid culture was prepared by inoculating with 0.1% (w/w) *Lactococcus lactis* (CHN-11, Christian Hansen) and culturing at 36° C. for 24 hours. The number of the bacteria in the liquid culture was $1.0 \times 10^7$ cfu/g.

Preparation Example 2. Preparation of Liquid Culture: *Lactobacillus brevis*

A liquid culture was prepared in the same manner as in Preparation Example 1 by using *Lactobacillus brevis* instead of *Lactococcus lactis*. The number of the bacteria in the liquid culture was $1.0 \times 10^7$ cfu/g.

Preparation Example 3. Preparation of Liquid Culture: *Lactococcus lactis*+*Lactobacillus brevis*

A liquid culture was prepared in the same manner as in Preparation Example 1 by using a mixture of *Lactococcus lactis* and *Lactobacillus brevis* of the same quantity. The number of the bacteria in the liquid culture was $1.0 \times 10^7$ cfu/g.

Control Group 1.

Ethiopia Yirgacheffe G1 green coffee beans were used.

Example 1. Use of Liquid Culture of Preparation Example 1

Washed Ethiopia Yirgacheffe G1 green coffee beans were frozen at −20° C. for 8 hours and then the frozen green coffee beans were immersed in water at 25° C. for 6 hours. The green coffee beans were taken out and put in a container after completely removing the water. After conducting internal germination by supplying air for 7 hours while maintaining the temperature of the container at 25° C., followed by sterilization for 1 minute, the internally germinated green coffee beans were mixed with the liquid culture prepared in Preparation Example 1 and then fermented at 36° C. for 20 hours. Fermented green coffee beans were prepared by filtering the green coffee beans, sterilizing them instantly at 100° C. for 10 seconds, cooling immediately with cold water and then drying in the air at 30° C. for 14 hours.

Example 2. Use of Liquid Culture of Preparation Example 2

Fermented green coffee beans were prepared in the same manner as in Example 1 by using the liquid culture of Preparation Example 2 instead of the liquid culture of Preparation Example 1.

Example 3. Use of Liquid Culture of Preparation Example 3

Fermented green coffee beans were prepared in the same manner as in Example 1 by using the liquid culture of Preparation Example 3 instead of the liquid culture of Preparation Example 1.

Example 4. Calcium Oxide

Fermented green coffee beans were prepared in the same manner as in Example 1 by adding calcium oxide (0.1 part by weight per 100 parts by weight of the water) and immersing the green coffee beans in an aqueous calcium oxide solution for 10 minutes after the immersion in the water for 6 hours.

Example 5. Enzymatic Treatment

Fermented green coffee beans were prepared in the same manner as in Example 1 by enzymatically treating the green coffee beans by adding 0.1 part by weight of polygalacturonase, 0.1 part by weight of pectinase, 0.1 part by weight of hemicellulose and 0.1 part by weight of cellulase to 100 parts by weight of the internally germinated green coffee beans and treating at 50° C. for 30 hours, sterilizing for 1 minute and then fermenting with the liquid culture prepared in Preparation Example 1.

Comparative Example 1. Omission of Internal Germination

Fermented green coffee beans were prepared in the same manner as in Example 1 by conducting fermentation immediately after immersing the washed Ethiopia Yirgacheffe G1 green coffee beans in the water.

Comparative Example 2. Omission of Fermentation

Fermented green coffee beans were prepared in the same manner as in Example 1 by internally germinating the green coffee beans immersed in the water, sterilizing the same immediately and then drying the same.

Comparative Example 3. Budding Instead of Internal Germination Using Air

Fermented green coffee beans were prepared in the same manner as in Example 1 by completely budding the green coffee beans for 40 hours by spraying water once for 100 minutes under the condition of three-wavelength LED 670 mh instead of supplying air during the germination.

Comparative Example 4. Budding

Fermented green coffee beans were prepared in the same manner as in Example 1 by budding the green coffee beans after removing water by supplying air at 30° C. for 20 hours and then conducting fermentation by fermenting the same with the liquid culture prepared in Preparation Example 1.

TEST EXAMPLE 500 g of the fermented green coffee beans prepared in the examples and comparative examples were added to a semi-rotating fluidized-bed roaster (Taehwan Proaster) at 220° C. and roasted by cinnamon roasting (first crack, medium roast), high roasting (immediately before second crack, city roast) and French roasting (second crack, Italian roast). 10 g of the fermented coffee beans were pulverized into 0.25 mm particles and then 30 mL was extracted with an extractor (Reneka Viva S) for 25 seconds at 9 atm and at about 90° C.

Test Example 1. Measurement of Caffeine, GABA, Isoflavone and Total Polyphenols 1-1. Caffeine (mg/kg): The extracted coffee was filtered through a syringe filter and was used as a sample for HPLC analysis. A PDA (photodiode array) HPLC system equipped with a C18 column (YMC-Triart C18, 4.6×250 mm) was used. As mobile phases, water containing 1% acetic acid and acetonitrile were used as solvents A and B, respectively. The concentration of the solvent B was increased initially from 8% to 27% for 40 minutes and then to 100% for 7 minutes for concentration-gradient analysis. The flow rate of the solvent was set to 1 mL/min, the wavelength of a detector to 280 nm, and the column oven temperature to 30° C.

1-2. GABA (mg/g): After adding accurately 1 mL of the extracted coffee to a test tube and then adding 4 mL of HPLC-grade water, hydrolysis was conducted at 60° C. for 1 hour. After the hydrolysis, 2 mL of 5-sulfosalicylic acid was added. After precipitating proteins for 2 hours, only the supernatant was evaporated completely at 60° C. After dissolving the remaining filtrate by adding 2 mL of a lithium citrate buffer (pH 2.2) and adding 2 mL of 5-sulfosalicylic acid, proteins were precipitated by leaving alone for 2 hours. Then, after centrifuging for about 3 minutes, only the supernatant was evaporated completely at 60° C. under reduced pressure. After dissolving the remaining filtrate by adding 2 mL of a lithium citrate buffer (pH 2.2) and filtering through a 0.45-μm membrane filter, analysis was conducted by injecting into an automated amino acid analyzer.

1-3. Isoflavone (aglycoside, mg/100 g): UV chromatography was performed under the following conditions. UPLC: Water Acquity Ultra Performance LC System, Column: ACQUITY UPLCBEH C18 column (2.1 mm×50 mm, 1.7 μm, 40° C.), Mobile phase: A; 0.1% formic acid in water B; 0.1% formic acid in acetonitrile, Solvent gradient system: A:B (%, 0.6 mL/min) 0-8 min; 90:10, 8-10 min 90:10 to 1:100, 10-12 min 0:100, 12-12.5 min 1:100 to 90:10, 12.5-15 min 90:10, Injection volume: 3 μL.

1-4. Total polyphenols (mg/g): Measurement was made according to the modified Folin-Denis method. That is to say, after adding 0.2 mL of the sample dissolved in distilled water to a test tube and adding 5 mL of distilled water, the mixture was allowed to stand at room temperature for 3 minutes. Then, after adding 1 mL of a saturated 10% $Na_2CO_3$ solution and conducting reaction at room temperature for 1 hour, the absorbance of the supernatant was measured at 700 nm. Caffeic acid at concentrations of 0-100 μg/mL was analyzed in the same manner as a standard reference, and the total phenol content of the extract was calculated from a standard calibration curve.

TABLE 1

|  | Caffeine | GABA | Isoflavone | Total polyphenols |
| --- | --- | --- | --- | --- |
| Control group 1 | 5,155 | 0.21 | 1.15 | 9.13 |
| Example 1 | 2,629 | 0.35 | 2.08 | 8.68 |
| Example 2 | 4,125 | 0.28 | 1.84 | 7.93 |
| Example 3 | 2,248 | 0.31 | 2.61 | 9.19 |
| Example 4 | 2,618 | 0.24 | 1.47 | 8.56 |
| Example 5 | 1,923 | 0.42 | 2.35 | 9.99 |
| Comparative Example 1 | 5,108 | 0.23 | 1.17 | 7.11 |
| Comparative Example 2 | 5,097 | 0.21 | 1.14 | 7.10 |
| Comparative Example 3 | 4,759 | 0.21 | 1.27 | 7.97 |
| Comparative Example 4 | 5,098 | 0.21 | 1.16 | 7.50 |

As shown in Table 1, the coffee extracts prepared using the green coffee beans prepared according to Examples 1-5 had a lower content of caffeine and higher contents of GABA, isoflavone and total polyphenols as compared to the control group and Comparative Examples 1-4.

Test Example 2. Sensory Test

An expert panel of 12 people were asked to taste the coffee extracts prepared using the fermented green coffee beans prepared in the examples and comparative examples and evaluate according to a 5-point scale. The scores were averaged and are given in [Table 2].

Sour taste, color, fruit flavor and overall preference: 1=very poor, 9=very good.

Astringent taste, bitter taste, odor and stench: 1=very weak, 9=very strong.

TABLE 2

|  | Control 1 | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
| --- | --- | --- | --- | --- | --- | --- | --- | --- | --- | --- |
| Astringent taste | 5.67 | 3.19 | 3.71 | 3.10 | 4.87 | 3.89 | 6.71 | 6.69 | 6.75 | 8.15 |
| Bitter taste | 6.89 | 4.75 | 5.19 | 4.35 | 5.22 | 4.09 | 6.57 | 6.66 | 6.15 | 8.28 |
| Sour taste | 5.77 | 6.88 | 6.71 | 7.11 | 7.08 | 7.49 | 5.51 | 5.83 | 6.23 | 4.25 |
| Color | 6.02 | 8.02 | 8.19 | 8.11 | 8.15 | 8.51 | 6.12 | 6.35 | 7.58 | 3.09 |
| Odor | 7.81 | 4.91 | 5.35 | 4.39 | 4.76 | 4.28 | 6.97 | 7.51 | 6.28 | 7.40 |
| Stench | 7.96 | 4.87 | 5.29 | 4.53 | 4.39 | 4.12 | 6.71 | 7.63 | 6.31 | 7.95 |
| Fruit flavor | 4.88 | 6.48 | 6.15 | 7.32 | 7.19 | 7.78 | 5.18 | 5.56 | 6.02 | 4.00 |
| Overall preference | 5.97 | 7.82 | 7.51 | 8.13 | 8.02 | 8.44 | 5.88 | 6.02 | 6.95 | 3.72 |

As shown in Table 2, the coffee extracts prepared using the green coffee beans prepared according to Examples 1-5 showed superior sour taste, color, fruit flavor and overall preference and decreased astringent taste, bitter taste, odor and stench as compared to the control group and Comparative Examples 1-4.

INDUSTRIAL APPLICABILITY

The fermented green coffee beans according to the present disclosure may be used for coffee prepared in coffee shops, instant coffee, etc.

We claim:

1. A method for producing fermented green coffee beans, comprising:
   (A) a step of freezing green coffee beans at −10 to −25° C.;
   (B) a step of immersing the frozen green coffee beans in water for 3 to 10 hours;
   (C) a step of taking out the green coffee beans immersed in the water, removing the water from the surface of the green coffee beans, and leaving the green coffee beans to stand for 5 to 15 hours while supplying air at 20 to 30° C.;
   (D) a step of sterilizing the green coffee beans and then inoculating the sterilized green coffee beans with a bacterial strain to anaerobically ferment the inoculated green coffee beans; and
   (E) a step of sterilizing and then drying the anaerobically fermented green coffee beans.

2. The method for producing fermented green coffee beans according to claim 1, which further comprises, after the step (C), a step of enzymatically treating the green coffee beans by adding 0.05-1 parts by weight of an enzyme per 100 parts by weight of the green coffee beans.

3. The method for producing fermented green coffee beans according to claim 2, wherein the enzyme is polygalacturonase, pectinase, hemicellulase, cellulase or a mixture thereof.

4. The method for producing fermented green coffee beans according to claim 1, wherein, in the step (A), the green coffee beans are frozen for 3 to 24 hours.

5. The method for producing fermented green coffee beans according to claim 1, wherein, in the step (B), the temperature of the water is 20 to 27° C.

6. The method for producing fermented green coffee beans according to claim 1, wherein, in the step (B), 0.05-0.1 part by weight of a mixture of calcium oxide or baking powder and salt is added per 100 parts by weight of the water 10 to 20 minutes before taking the green coffee beans out of the water.

7. The method for producing fermented green coffee beans according to claim 1, wherein, in the step (D), the bacterial strain is *Lactococcus lactis, Lactococcus cremoris, Lactococcus diacetyllactis, Leuconostoc mesenteroides, Lactobacillus brevis* or a mixture thereof.

8. The method for producing fermented green coffee beans according to claim 1, wherein, in the step (D), the anaerobic fermentation is performed at 35 to 41° C. after culturing the bacteria strain in liquid to $1.0 \times 10^5$ to $1.0 \times 10^{15}$ cfu/g.

9. Fermented green coffee beans produced by the method according to claim 1.

* * * * *